United States Patent [19]

Hagenlocher et al.

[11] 4,286,186

[45] Aug. 25, 1981

[54] VEHICULAR ALTERNATOR END SHIELD CONSTRUCTION

[75] Inventors: Walter Hagenlocher, Stuttgart; Heinz Hesse, Gerlingen; Karl Kleebaur, Allmersbach; Christoph Kugel; Rüdiger Sohnle, both of Stuttgart, all of Fed. Rep. of Germany

[73] Assignee: Robert Bosch GmbH, Stuttgart, Fed. Rep. of Germany

[21] Appl. No.: 85,116

[22] Filed: Oct. 15, 1979

[30] Foreign Application Priority Data

Oct. 20, 1978 [DE] Fed. Rep. of Germany ....... 2845665

[51] Int. Cl.³ .............................................. H02K 5/00
[52] U.S. Cl. .................................. 310/89; 310/68 D; 310/85; 310/254; 310/42
[58] Field of Search .................... 310/68 D, 68 R, 85, 310/88–91, 52–63, 42, 216, 217, 254, 258, 259

[56] References Cited

U.S. PATENT DOCUMENTS

| | | | |
|---|---|---|---|
| 3,078,409 | 2/1963 | Bertsche, Jr. et al. | 310/68 D X |
| 3,321,654 | 5/1967 | Allendorph | 310/42 X |
| 3,701,318 | 2/1955 | Feiertag | 310/89 X |
| 4,028,568 | 6/1977 | Tatsumi et al. | 310/68 R X |
| 4,186,319 | 1/1980 | Dochterman | 310/89 |

FOREIGN PATENT DOCUMENTS

1139196 11/1962 Fed. Rep. of Germany ............. 310/85

*Primary Examiner*—Mark O. Budd
*Attorney, Agent, or Firm*—Frishauf, Holtz, Goodman & Woodward

[57] ABSTRACT

To facilitate manufacture, and provide readily accessible insertion openings for rectifier diodes in automotive alternators, the end covers or end shields are made as sheet metal elements with radially extending arms, leaving space for ventilating openings therebetween, extending from the center of rotation of the alternator, and form with bearing retaining means at the center, for example in the form of a punch or drawn bushing extension extending in axial direction and at right angles to the major plane of the sheet metal element which, preferably, is also formed with stiffening ribs or beads at the lateral edges thereof. Preferably, the alternator is, in cross section, hexagonal and three arms, extending at 120° with respect to each other, the hexagonal outer end portions, are provided to permit universal fitting of the electrical connections with respect to the rotary position of the alternator shell and thus permit matching of the position of electrical connection to various attachment positions of the shell on an internal combustion engine.

7 Claims, 3 Drawing Figures

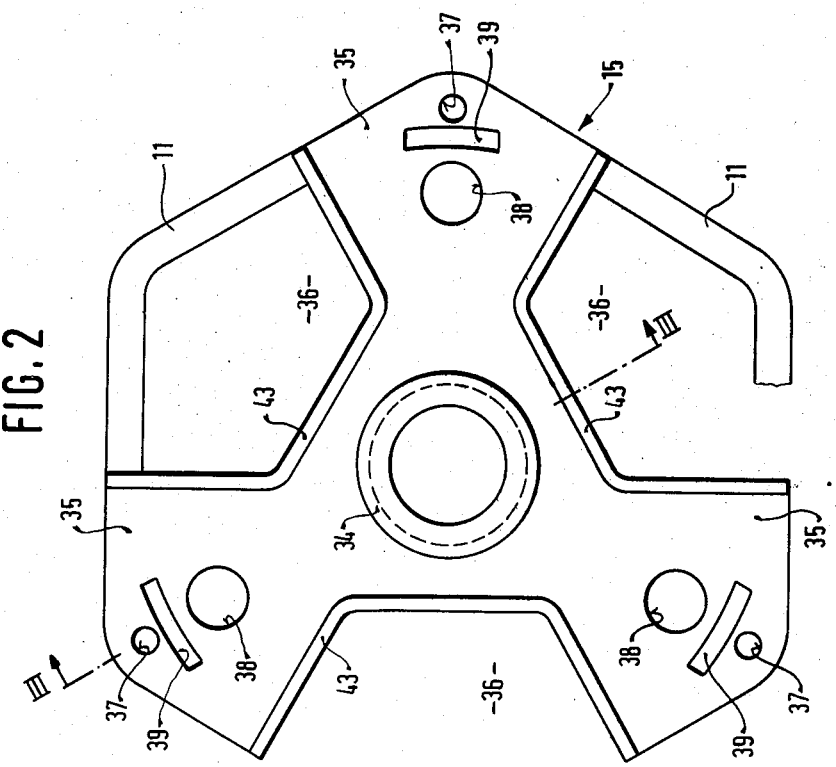

VEHICULAR ALTERNATOR END SHIELD CONSTRUCTION

Reference to related applications, assigned to the assignee of the present invention: U.S. Ser. No. 85,115, filed Oct. 15, 1979, by the inventors hereof.

The present invention relates to an alternator construction, particularly adapted for use in automotive vehicles, and especially to three-phase alternators to be driven by a belt from an output shaft or pulley coupled to an internal combustion (IC) engine.

BACKGROUND AND PRIOR ART

Alternators, and particularly vehicular, automotive-type alternators, usually have a housing therefor which retains bearings for the operating shaft of the machine. The housing customarily includes a pair of bell or cup-shaped ends which have the bearings secured therein. Frequently, diodes which are provided to rectify the a-c output from the alternator are also fitted into the housing, by press-fitted or interference-fitted in suitable openings formed in one of the end bells or end covers forming the housing. If the end bells are cup-shaped, it is difficult to insert the diodes and frequently it is not economical to fit them directly into the end bells. Manufacture of the end bells themselves is restricted to only a few manufacturing processes, for example mold casting, injection casting, or die casting.

THE INVENTION

It is an object to provide an alternator construction, particularly suitable for automotive alternators, in which rectifiers can be easily inserted into and attached to the alternator housing and which permits constructing the alternator by manufacturing methods which are less expensive than those used in accordance with the prior art.

Briefly, the alternator has an essentially cylindrical housing in which the stator is fitted. The end covers of the housing are not constructed as bells, but rather at least one of the end covers is a star-shaped sheet metal structure which has arms which extend radially from the axis of rotation of the machine in which the bearing is fitted. The star-shaped steel metal structure is formed, centrally, with a bearing retaining opening, for example in the form of a punched-out bushing in which the respective bearing for the shaft is seated. Preferably, the star-shaped element has three arms which, at the outer circumference, are angled to fit against a hexagonal housing shell surrounding the stator. To provide for stiffness, the edges of the sheet metal end cover can be angled off to form right-angle L-beads.

The machine in accordance with this construction has a number of advantages with respect to prior art automotive-type alternators. Assembly of rectifier elements into the sheet metal end cover is simplified and the operating characteristics of the rectifier diodes can be readily tested without experiencing difficulties in making connection thereto. Various types of manufacturing processes are possible in order to make the end cover structures. For example, the sheet metal end structure can be punched and press-shaped by flowing the metal into the desired shape; the end bell can be extrusion-pressed; other manufacturing processes are also possible, such as injection casting, mold casting, or die casting. Excellent cooling of the rectifier diodes is obtained.

Forming the end cover as a three-pointed star element, in combination with a hexagonal housing, has the advantage that the position of the electrical connection with respect to holding arrangements on the machine housing can be changed in steps which are angularly related to each other by 60°; thus, a single series of structures can be made to be assembled in various angular relationships with the housing to fit existing connection fittings on internal combustion engines of various types of automotive vehicles, thus further facilitating stocking and mass production manufacture of the alternator due to its capability to match many different types of engines.

DRAWINGS

Illustrating a preferred example, wherein:

FIG. 2 is an end view of the end shield remote from the drive side; and

FIG. 3 is a cross section along line III—III of FIG. 2, wherein it is to be noted that the section line III—III is angled through the center of rotation of the alternator.

Figure 1:
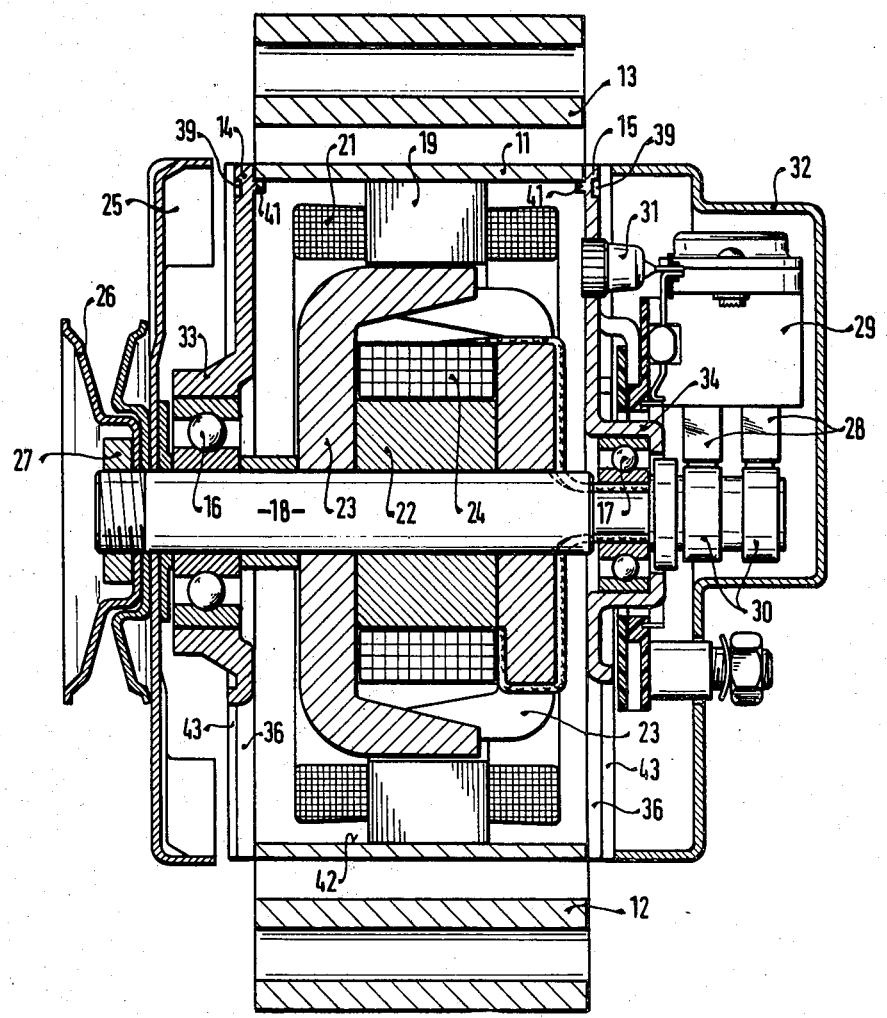
FIG. 1 is a highly schematic axial cross section through an alternator in accordance with the present invention.

The alternator (FIG. 1) has an outer housing 11 which, preferably, in cross section is hexagonal. Attachment elements 12 and 13 are secured to the housing 11 to attach the alternator to a support structure, for example to an internal combustion engine. The attachment element 12 is a laterally projecting elongated arm formed with a bore therethrough to pass a holding bolt through the arm 12 and into the support structure. Another arm 13 is provided to permit pivoting the housing 11 about the one or other arm while locating the housing in fixed position so that a belt passing about a pulley 26 can be tightened. This construction is well known. The housing further includes a pair of end covers or end shields 14, 15. The end covers 14, 15 retain bearings 16, 17 to journal the shaft 18 of the machine. The housing shell 11 has the armature 19 with armature winding 21 thereon press-fitted therein. The machine shaft 18 supports a rotor having a core 22, interdigited or claw pole shoes 23 and a field winding 24. A ventilator or fan blade 25 and the pulley 26 are further secured to the shaft 18 by means of a nut 27.

The ends of the field winding 24 are connected to slip rings 30 secured on the shaft 18. The slip rings 30 are supplied with current by brushes secured in a brush holder 28 in accordance with control from a voltage regulator 29. Rectifier diodes 31 are fitted into the end cover or end shield 15. The rectifier diodes are electrically connected to the armature winding 21 in accordance with well known rectifier circuits. The electrical portions of the machine are protected by a cover 32 secured to the end cover or shield 15 of the machine. The bearings 16, 17 are secured in suitable bearing bushings 33, 34 formed in the respective end covers or shields 14, 15.

FIGS. 2 and 3 illustrate the end shield 15 in greater detail. In plan view, the shield 15 is star-shaped. The central bushing 34 is located concentrically with the axis of rotation of the machine, and three radially symmetrical star arms 35 extend outwardly therefrom. Spaces 36 are formed between the arms 35. The area of the spaces 36 is such that good cooling of the electrical machine is ensured, when air is drawn axially therethrough by the ventilator or fan blade 25 (FIG. 1). Openings 37 are formed adjacent the lateral ends of the arms 35, used to receive screws or similar attachment elements to secure the shield 15 to the housing shell 11. Further openings 38 are formed in the shield 15 into which rectifier diodes 31 can be secured by press-fitting. Punch marks 39 are located in the vicinity of the openings 37 which, at the inner side of the shield 15—with respect to the alternator—result in inwardly directed projections 41. The projections 41 form engagement surfaces to position the arms 35 against the inner surface 42 (FIG. 1) of the shell 11, to accurately center the position of the bearing holder or end shield 15 with respect to the shell 11. The inwardly directed projections 41 are clearly seen in FIGS. 1 and 3 placed adjacent the carriers of the hexagonal shell 11.

The edges of the arms 35 are bent upwardly, for example by about 90°, to form an L-shaped bead to increase the stiffness of the end cover or shield 15 and to ensure mechanical stability thereof.

Various modifications and changes may be made within the scope of the inventive concept; only one of the end covers or shields 14, 15 need be constructed as described.

We claim:

1. Vehicular alternator construction, particularly for automotive vehicles comprising
   a tubular housing (11);
   a stator (19, 21) secured in the housing;
   the rotor (22, 23, 24) having a rotor shaft (18);
   bearings (16, 17) journalling the rotor;
   the end covers (14, 15) secured at respective ends of the housing and retaining said bearings, extending transversely to the axis of rotation of the shaft;
   at least one of the end covers being a star-shaped sheet metal structure having three arms (35) extending radially symmetrically outwardly from the axis of rotation of the shaft;
   the area (36) between the arms being large with respect to the area covered by the arms (35) themselves to provide a large air ingress opening for ventilating air for the machine;
   a bushing-like structure formed centrally in the respective end cover (14, 15) within which the respective bearing (16, 17) is seated;
   the edges of the arms and the central bushing (33, 34) being formed with an essentially right-angle projection extending from the major plane of the star-shaped sheet metal structure to form stiffening ribs along the sides of the arms and said bushing;
   inwardly extending projections (41) formed adjacent the ends of the respective arms (35) of the end covers or shields (14, 15) and fitting atainst the inner surface (42) of the housing shell (11) for the accurate positioning of the respective end cover or shield with respect to the shell (11);
   and attachment openings (37) positioned close to the ends of the respective arms (35) to permit attaching the respective end cover or shield to the housing shell (11).

2. Construction according to claim 1 wherein the cross-section of the tubular shell (11) is essentially hexagonal, and said shell has an essentially hexagonal inner surface;
   the three arms (35) have an outer surface configuration fitting against the hexagonal outline of the housing shell (11);
   and wherein the inwardly extending projections (41) are angled and shaped to fit against the corners formed by the inner surface of the hexagonal tubular housing shell to provide for positive positioning and location of said arms of the end shield with respect to the housing shell.

3. Construction according to claim 1, wherein at least one of the arms is formed with openings (38) to fit rectifier diodes (31) therein.

4. Construction according to claim 1 wherein the cross-section of the tubular housing shell (11) is essentially hexagonal;
   the three arms (35) have an outer surface configuration fitting against the hexagonal outline of the housing shell (11).

5. Construction according to claim 1, wherein the star-shaped sheet metal structure forming the end cover or shield (14, 15) is an extrusion-pressed sheet metal element.

6. Construction according to claim 1, wherein the star-shaped sheet metal structure forming the end cover or shield (14, 15) is a deep-drawn sheet metal element.

7. Construction according to claim 1 or 4 or 2, wherein two end covers or shields are provided at respective opposite axial ends of the machine, both said end covers or shields comprising said star-shaped sheet metal structure.

* * * * *